United States Patent

Al-Sabah

Patent Number: 6,041,838
Date of Patent: Mar. 28, 2000

[54] HYDRAULIC OR PNEUMATIC WHEEL FOR A LIGHT-WEIGHT VEHICLE AND METHOD OF USING SAME

[76] Inventor: Sabah Naser Al-Sabah, P.B. 36777, Al-Ras, 24758, Kuwait

[21] Appl. No.: 08/893,082

[22] Filed: Jul. 15, 1997

[51] Int. Cl.$^7$ ....................................................... B60B 5/18
[52] U.S. Cl. ................................................................ 152/55
[58] Field of Search .................................. 152/8, 17, 53, 152/55, 91, 93, 97, 100

[56] References Cited

U.S. PATENT DOCUMENTS

| | | |
|---|---|---|
| 865,115 | 9/1907 | Markham . |
| 924,036 | 6/1909 | Burgess . |
| 985,039 | 2/1911 | Kimball ................................ 152/100 X |
| 988,368 | 4/1911 | Morgan . |
| 1,061,537 | 5/1913 | Gruss . |
| 1,071,571 | 8/1913 | Pendell ...................................... 152/55 |
| 1,081,628 | 12/1913 | Schur . |
| 1,086,162 | 2/1914 | Gray ........................................ 152/93 |
| 1,144,879 | 6/1915 | Ubezzi ...................................... 152/93 |
| 1,144,996 | 7/1915 | Borland . |
| 1,163,562 | 12/1915 | Schipfer . |
| 1,293,994 | 2/1919 | Vauclain . |
| 1,295,378 | 2/1919 | Smith et al. . |
| 1,343,986 | 6/1920 | Shafer ....................................... 152/93 |
| 1,396,283 | 11/1921 | Perry .................................... 152/93 X |
| 1,401,845 | 12/1921 | Wilcox ..................................... 152/93 |
| 1,436,840 | 11/1922 | Weirich ................................ 152/55 X |
| 1,441,093 | 1/1923 | Hubble . |
| 1,465,747 | 8/1923 | Vobach ..................................... 152/93 |
| 1,485,977 | 3/1924 | Gillen ........................................ 152/55 |
| 1,550,596 | 8/1925 | Velasco ..................................... 152/55 |
| 1,592,183 | 7/1926 | Golyer . |
| 1,808,886 | 6/1931 | Courtney . |
| 1,979,935 | 11/1934 | Henap ....................................... 152/55 |

FOREIGN PATENT DOCUMENTS

| | | |
|---|---|---|
| 607892 | 7/1994 | European Pat. Off. .................. 152/55 |
| 235200 | 1/1911 | Germany .................................. 152/55 |
| 87485 | 1/1918 | Germany .................................. 152/55 |

*Primary Examiner*—Russell D. Stormer
*Attorney, Agent, or Firm*—Allen, Dyer, Doppelt, Milbrath & Gilchrist, P.A.

[57] ABSTRACT

A wheel for a light-weight vehicle and associated methods are provided wherein the wheel has a relatively light-weight, has structural strength, and provides shock absorbing capabilities. A wheel according to an embodiment of the present invention preferably includes an annular-shaped wheel rim adapted to have a tire mounted thereto and an annular-shaped wheel hub positioned inwardly and spaced-apart from the wheel rim and adapted to be rotatably mounted to a frame of a light-weight vehicle. A non-circular shaped hub plate member has a medial portion thereof connected to the wheel hub and has other portions extending outwardly therefrom toward the wheel rim. The other portions include a plurality of plate member tips each formed along a radial axis extending outwardly from the wheel hub toward the wheel rim. A plurality of spokes is positioned in a spaced-apart relation to each other. Each of the plurality of spokes has a first end connected to the wheel rim and a second end connected to one of the plurality of plate member tips of the hub plate member in an offset position from the respective radial axis thereof. Each of the plurality of spokes includes a pressurized cylinder. The pressurized cylinder preferably has a housing, a piston movable within the housing, and a piston rod connected to the piston and extending outwardly therefrom.

36 Claims, 3 Drawing Sheets

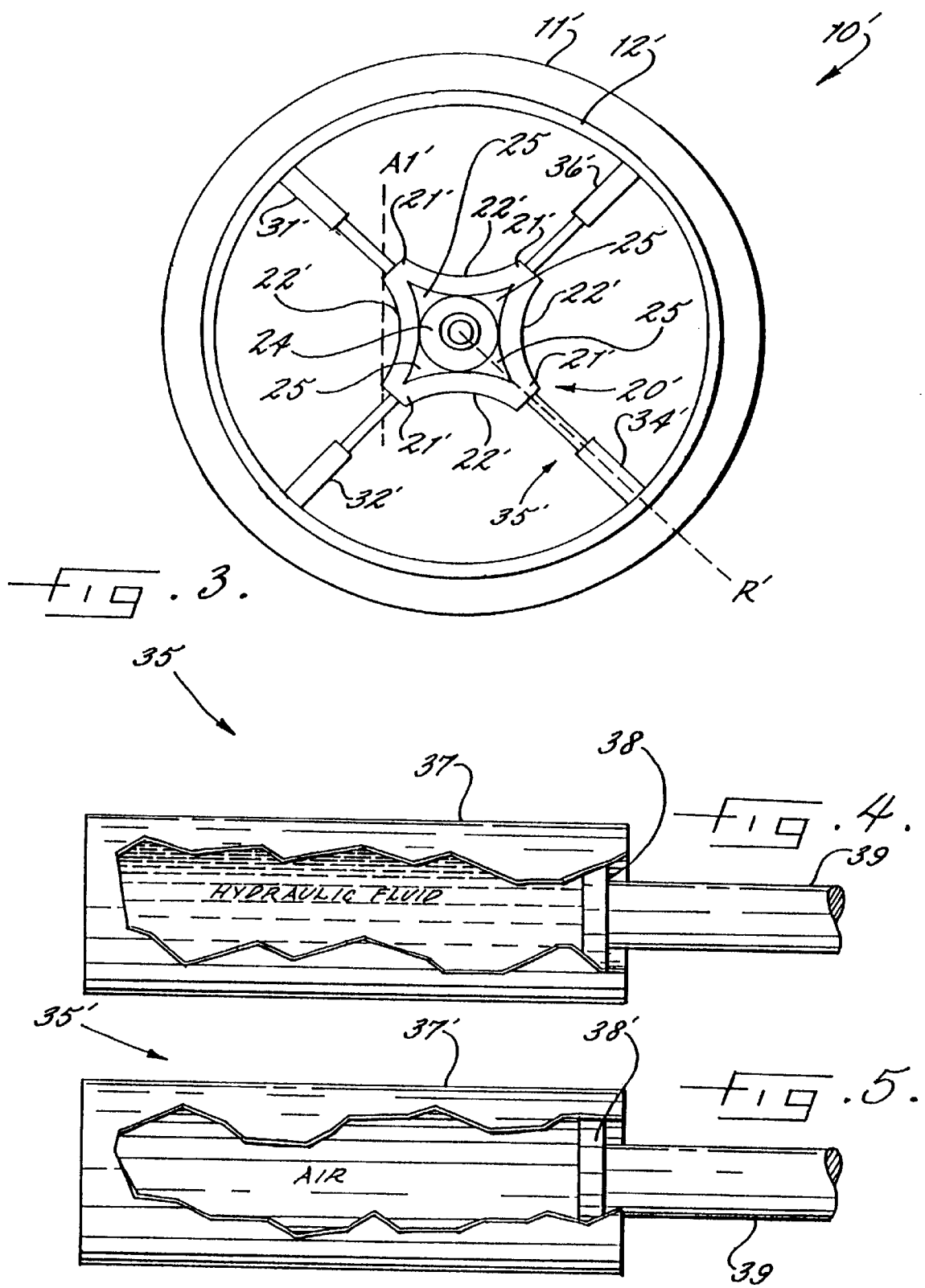

//6,041,838//

HYDRAULIC OR PNEUMATIC WHEEL FOR A LIGHT-WEIGHT VEHICLE AND METHOD OF USING SAME

FIELD OF THE INVENTION

The present invention relates to the transportation industry and, more particularly, to wheels and methods of using wheels.

BACKGROUND OF THE INVENTION

Bicycle development has extensively evolved since its original development in the late 1800's. Now, bicycles have become known as a practical, cheap, and efficient mode of transportation. This evolution of bicycle development has included the development of different types of metal material particularly for use in the construction of the frame of the bicycle. These metal developments have been primarily targeted at producing a frame for a light weight bicycle that still has structural strength.

Despite these metal developments for the frame of the bicycle, less has been done to address the wheel of the bicycle and other light weight vehicles such as wheelchairs or carts. Instead, much of the early wheel development was focused primarily on heavy automobile wheels, e.g., trucks or cars, and primarily before the development of the modern day shock absorber and suspension systems. Examples of some of these early wheel development can be seen in U.S. Pat. No. 8,655,115 by Markham titled "Wheel," U.S. Pat. No. 1,436,840 by Weirich titled "Vehicle Wheel," U.S. Pat. No. 1,550,596 by Velasco titled "Pneumatic Wheel," and U.S. Pat. No. 1,979,935 by Henap titled "Hydraulic Spoke Wheel." Although many of these wheels have shock absorbing designs using hydraulic or pneumatic cylinders, these wheels are heavy, bulky, expensive to manufacture, and lack effective aerodynamic design or construction. Accordingly, these are especially impractical for bicycle and other light weight vehicle design. Also, as set forth above, most heavy automobiles and other heavy vehicles have shock absorbing or other suspension systems to protect the vehicle and wheels from damage during travel over various terrains.

Because wheels for bicycles and other light-weight vehicles, however, have focused primarily on conventional bicycle wheel designs, e.g., a plurality of thin, spaced-apart spokes, there remains a need for an aerodynamic, light-weight, and effective wheel for these light-weight vehicles that is relatively less expensive to manufacture and yet has structural strength to withstand the stress of the weight of passenger over various terrain.

SUMMARY OF THE INVENTION

With the foregoing in mind, the present invention advantageously provides a hydraulic or pneumatic wheel and methods of using a wheel which reduce or inhibit damage to the wheel itself, particularly where the wheel uses light-weight metal material or other light weight materials for the construction thereof. The present invention also advantageously provides a hydraulic or pneumatic wheel and associated methods that improved shock absorption when used is association with light weight vehicles such as bicycles, wheelchairs, carts, and the like. The present invention additionally advantageously provides a hydraulic or pneumatic wheel and associated methods which provide structural strength and yet is relatively less expensive to manufacture.

More particularly, a wheel for a light-weight vehicle is provided according to a first embodiment of the present invention and preferably includes an annular-shaped wheel rim adapted to have a tire mounted thereto and an annular-shaped wheel hub positioned inwardly and spaced-apart from the rim and adapted to be rotatably mounted to a frame of a light-weight vehicle. The wheel also preferably includes a hub plate member having a medial portion thereof connected to the wheel hub and having other portions extending outwardly therefrom toward the wheel rim. The other portions including a plurality of plate member tips each formed along a radial axis extending outwardly from the wheel hub. The wheel further includes a plurality of spokes is positioned in a spaced-apart relation to each other. Each of the plurality of spokes has a first end connected to the rim and a second end connected to one of the plurality of plate member tips of the hub plate member in an offset position from the respective radial axis thereof. Each of the plurality of spokes comprising a pressurized cylinder, e.g., a hydraulic or pneumatic pressurized cylinder, which includes a housing, a piston movable within the housing, and a piston rod connected to the piston and extending outwardly therefrom.

According to an aspect of the first embodiment of the present invention, the offset position of each of the plurality of spokes is further defined by each of the spokes being connected to a respective one of the plate member tips at a predetermined angle from the radial axis thereof and defining an operative offset spoke axis for the respective pressurized cylinder which intersects the radial axis of the plate member tips at the predetermined angle. The predetermined angle is preferably less than 90 degrees and is defined from the wheel hub, to the intersection of the radial and offset spoke axes, and toward the wheel rim along the offset spoke axis. The piston and piston rod of each the plurality of pressurized cylinders are operatively movable along the offset spoke axis.

According to a second embodiment of the present invention, a wheel for a light-weight vehicle is provided which includes an annular-shaped wheel rim adapted to have a tire mounted thereto and an annular-shaped wheel hub positioned inwardly and spaced-apart from the rim and adapted to be rotatably mounted to a frame of a light-weight vehicle. The wheel also includes a non-circular shaped hub plate member having a medial portion thereof connected to the wheel hub and having other portions extending outwardly therefrom toward the wheel rim. The other portions include a plurality of plate member tips each formed along a radial axis extending outwardly from the wheel hub. The non-circular shaped hub plate member additionally can have peripheral recessed portions extending between each of the plurality of plate member tips and being recessed from an axis also extending between the plurality of plate member tips and extending inwardly toward the wheel hub. The wheel further includes a plurality of spokes positioned in a spaced-apart relation to each other. Each of the plurality of spokes has a first end connected to the rim and a second end connected to a respective one of the plurality of plate member tips of the hub plate member in a coaxial alignment with the respective radial axis thereof. Each of the plurality of spokes has a pressurized cylinder which includes a cylindrical housing, a piston movable within the cylindrical housing, and a piston rod connected to the piston and extending outwardly therefrom.

According to a third embodiment of the present invention, a wheel for a light-weight vehicle is provided which includes an annular-shaped wheel rim adapted to have a tire mounted thereto and an annular-shaped wheel hub positioned inwardly and spaced-apart from the rim and adapted to be rotatably mounted to a frame of a light-weight vehicle. The wheel also includes a hub plate member having a medial portion thereof connected to the wheel hub and having other portions extending outwardly therefrom toward the wheel rim and a plurality of spokes positioned in a spaced-apart relation to each other. Each of the plurality of spokes has a first end connected to the rim and a second end connected to the hub plate member along a respective radial axis. Each of the plurality of spokes includes a spoke plate member. The wheel further includes a plurality of pressurized cylinders connected to and extending between the spoke plate members. Each of the plurality of pressurized cylinders includes a cylindrical housing, a piston movable within the cylindrical housing, and a piston rod connected to the piston and extending outwardly therefrom.

The present invention also advantageously provides methods of using a wheel for a light weight vehicle. A method according to an embodiment of the present invention preferably includes providing a wheel which includes a wheel rim, a wheel hub positioned inwardly and spaced-apart the rim, a hub plated member connected to the hub, and a plurality of spokes each connected to and extending between the rim and the hub plate member along a respective offset spoke axis. Each of the plurality of spokes includes a pressurized cylinder having at least a housing and a piston movable with the housing. The method also includes rotatably mounting the wheel to a frame of a light weight vehicle and operably moving the piston of a pressurized cylinder connected to the hub plate member in an offset position so as to absorb shock received by the wheel rim.

Another method of using a wheel for a light weight vehicle preferably includes providing a wheel which includes a wheel rim, a wheel hub positioned inwardly and spaced-apart the rim, a hub plated member connected to the hub, a plurality of spokes each connected to and extending between the rim and the hub plate member along a radial spoke axis, and a corresponding plurality of pressurized cylinders each connected to and extending between a pair of the plurality of spokes and each having at least a housing and a piston movable with the housing. The method also includes rotatably mounting the wheel to a frame of a light weight vehicle and operably moving the piston of a pressurized cylinder connected to one of the plurality of spokes so as to absorb shock received by the wheel rim.

Because a hydraulic or pneumatic wheel according to the present invention is advantageously light weight, aerodynamic, absorbs shock, inhibits damage to the tire or rim, and yet has structural strength, the wheel is particularly advantageous for various light weight vehicles such as bicycles, tri-cycles, wheel chairs, and carts. A wheel according to these embodiments of the present invention advantageously uses a minimal number of spokes for providing both the shock absorbing capabilities and the structural strength to support the rim in relation to the hub.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 3 is a front elevational view of a hydraulic or pneumatic wheel according to the second embodiment of the present invention;

FIG. 4 is an enlarged fragmentary view of cylinder and piston of a hydraulic or pneumatic wheel according to the present invention;

FIG. 5 is an enlarged fragmentary view of cylinder and piston of a hydraulic or pneumatic wheel according to the present invention;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
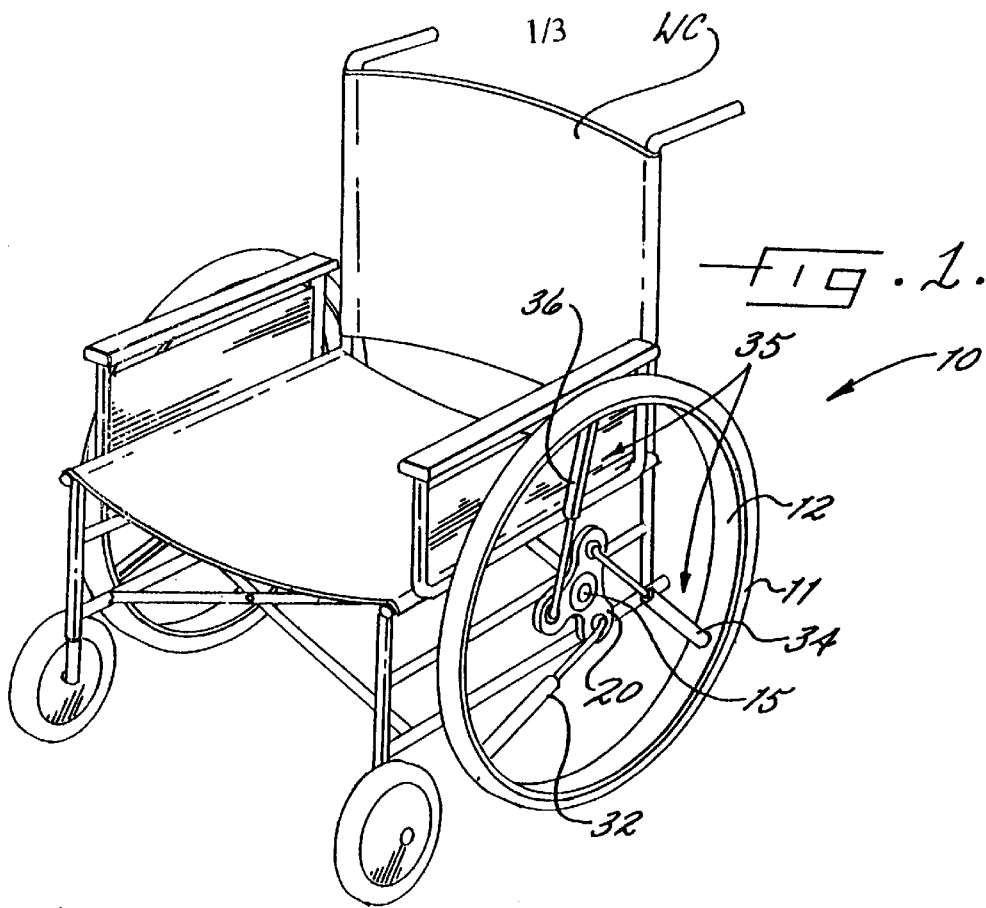
FIG. 1 is a perspective view of a hydraulic or pneumatic wheel mounted onto a wheelchair according to a first embodiment of the present invention.
Figure 2:
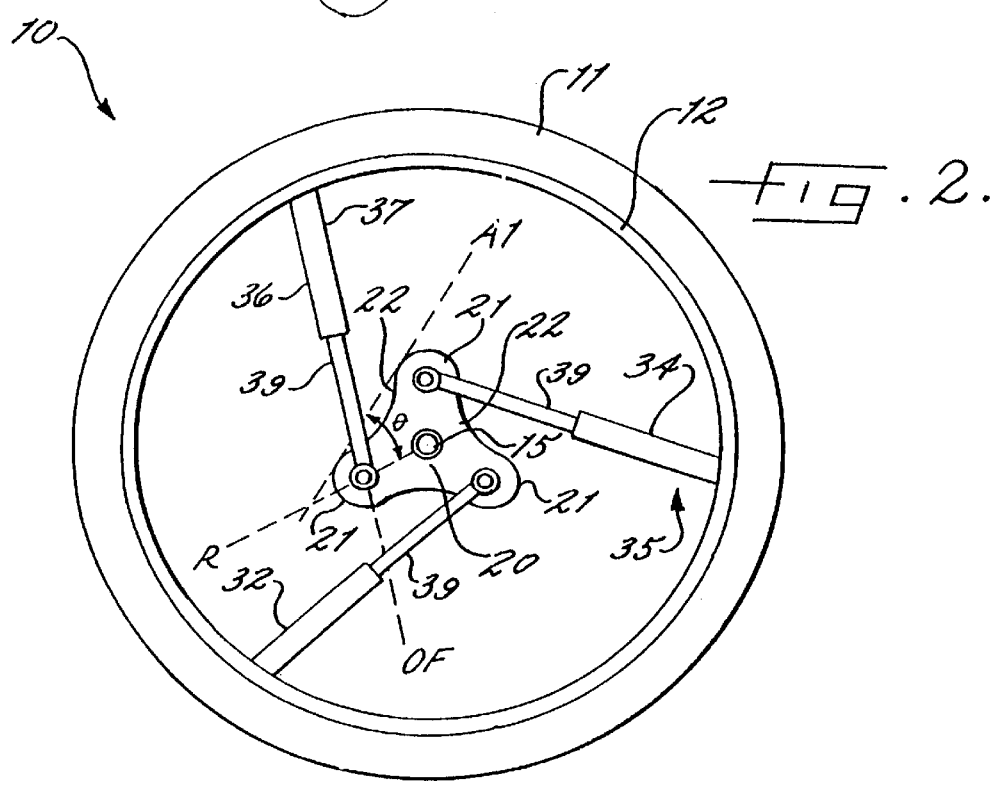
FIG. 2 is a front elevational view of a hydraulic or pneumatic wheel according to a first embodiment of present invention.

As illustrated in FIGS. 1–2, a wheel 10 for a light-weight vehicle is provided according to a first embodiment of the present invention. Light weight vehicles as defined herein are preferably not automobiles or other heavy vehicles which are engine driven and which often include shock absorbers or other suspension systems for protecting the wheels and frame of the vehicle. Because of the advantageous designs and constructions of the embodiments of a wheel 10, 10', 10" of the present invention, these wheels 10, 10', 10" are not anticipated to be used in conjunction with these heavier vehicles. In other words, the weight of these heavier vehicles could damage and make the wheel 10, 10', 10" of the present invention inoperative.

Figure 6:
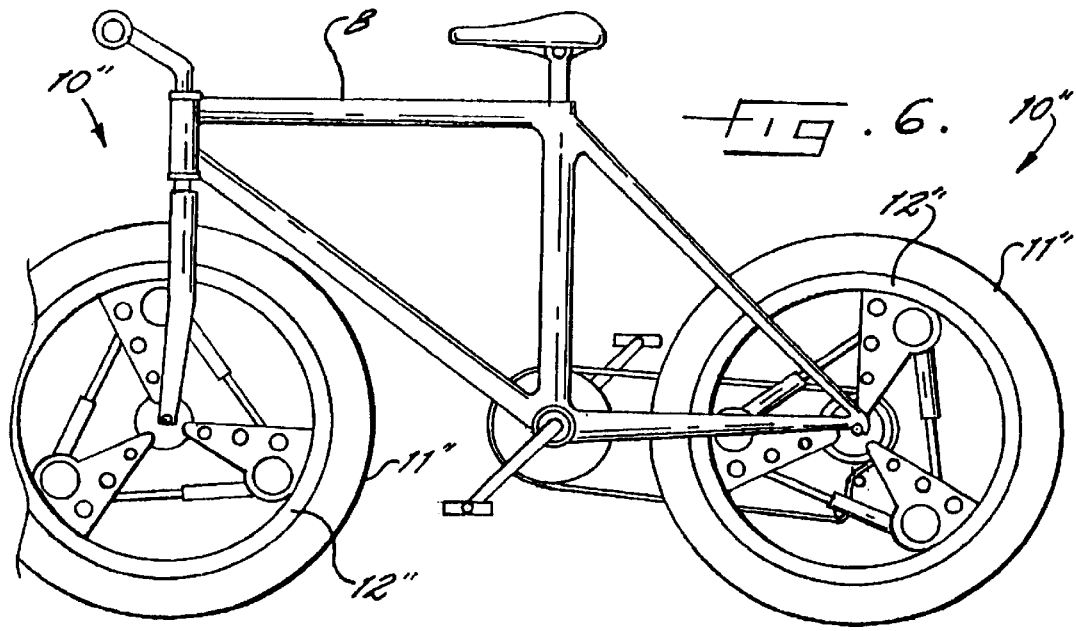
FIG. 6 is a elevational view of a bicycle having hydraulic or pneumatic wheels mounted thereon according to a third embodiment of the present invention.

A wheel 10 according to the first embodiment of the present invention preferably includes an annular-shaped wheel rim 12 adapted to have a tire 11 mounted thereto and an annular-shaped wheel hub 15 positioned inwardly and spaced-apart from the rim 12 and adapted to be rotatably mounted to a frame of a light-weight vehicle such as the wheel chair WC illustrated in FIG. 1 or a bicycle B as illustrated in FIG. 6. The wheel 10 also preferably includes a hub plate member 20 having a medial portion thereof connected to the wheel hub 15 and having other portions extending outwardly therefrom toward the wheel rim 12. The other portions preferably include a plurality of plate member tips 21 each formed along a radial axis R extending outwardly from the wheel hub 15. The non-circular shaped hub plate member 20 has peripheral recessed portions 22 extending between each of the plurality of plate member tips 21 and being recessed inwardly toward the wheel hub 15 from an axis A1 also extending between the plurality of plate member tips 21. The non-circular shape is preferably a generally triangular configuration. Each corner of the triangular configuration is rounded and defines one of the plurality of plate member tips 21. Each side 22 of the triangular configuration is concave inwardly toward the wheel hub and defines the recessed portions of the hub plate member 20.

A wheel 10 according to this first embodiment further includes a plurality of spokes 32, 34, 36 positioned in a spaced-apart relation to each other. Each of the plurality of spokes 32, 34, 36 has a first end connected to the rim 12 and a second end connected to one of the plurality of plate member tips 21 of the hub plate member 20 in an offset position from the respective radial axis R thereof. The offset position of each of the plurality of spokes 32, 34, 36 is further defined by each of the spokes being connected to a respective one of the plate member tips 21 at a predetermined angle θ from the radial axis R thereof and defining an operative offset spoke axis OF which intersects the radial axis R of the plate member tips 21 at the predetermined angle θ. The predetermined angle θ is preferably less than 90 degrees and is defined from the wheel hub 15, extending along the radial axis R to the intersection of the radial and offset spoke axes R, OF, and toward the wheel rim 12 along the offset spoke axis OF. Each of the plurality of spokes 32, 34, 36 advantageously includes a pressurized cylinder 35 which includes a housing 37, a piston 38 movable within the housing 37, and a piston rod 39 connected to the piston and extending outwardly therefrom.

The movable piston 38 advantageously provides shock absorbing capabilities and inhibits damage to the tire 11 and frame of the light weight vehicle. This design and construction of the wheel 10, however, preferably only uses three offset spokes 32, 34, 36 which are generally defined by these pressurized cylinders 35. The open area between the spokes 32, 34, 36 advantageously provides a path of air flow for aerodynamic purposes and for light weight construction. The positioning and structure of the spokes 32, 34, 36, however, in relation to the hub plate member 20 still provide structural strength for supporting the weight of people and goods generally used in association with light weight vehicles.

As illustrated in FIGS. 4–5, and as understood by those skilled in the art, the pressurized cylinders 35 can be hydraulic cylinders (see FIG. 4), pneumatic cylinders (see FIG. 5), other pressurized cylinders, or a combination of types of pressurized cylinders which accomplish the movable and shock absorbing function of the present invention. The piston 38 and piston rod 39 of each the plurality of pressurized cylinders 35 preferably are operatively movable along the offset spoke axis OF. Preferably, a proximal end of the housing 37 of each of the plurality of pressurized cylinders 35 is connected to the wheel rim 12. A distal end of the piston rod 39 of each of the plurality of pressurized cylinders 35 also is preferably connected to the plate member tips 21 of the hub plate member 20.

As best illustrated in FIG. 3, a wheel 10' according to a second embodiment of the present invention preferably includes an annular-shaped wheel rim 12' adapted to have a tire 11' mounted thereto and an annular-shaped wheel hub 15' positioned inwardly and spaced-apart from the rim 12' and adapted to be rotatably mounted to a frame of a light-weight vehicle. The wheel 10' also includes a non-circular shaped hub plate member 20' having a medial portion thereof connected to the wheel hub 15' and having other portions extending outwardly therefrom toward the wheel rim 12'. The other portions include a plurality of plate member tips 21' each formed along a radial axis R' extending outwardly from the wheel hub 15'. The non-circular shaped hub plate member 20' additionally can have peripheral recessed portions 22' extending between each of the plurality of plate member tips 21' and being recessed inwardly toward the wheel hub 15' from an axis A1' also extending between the plurality of plate member tips 21'. The non-circular shaped hub plate member 20' preferably has a generally rectangular configuration. Each corner of the rectangular configuration defines a plate member tip 21', and each side of the rectangular configuration is concave inwardly toward the wheel hub 15' and defines the recess portion 22'. The medial portion 24 of the generally rectangular-shaped hub plate member has a generally circular shape. The hub plate member further includes a plurality of triangular-shaped openings 25 each formed in the hub plate member 20' between the circular-shaped medial portion 24 and a respective one of the plurality of plate member tips 21' to thereby enhance aerodynamic and light weight qualities thereof.

The wheel 10' of this second embodiment further preferably includes a plurality of spokes 31, 32', 34', 36' positioned in a spaced-apart relation to each other. Each of the plurality of spokes 31, 32', 34', 36' has a first end connected to the rim 12' and a second end connected to a respective one of the plurality of plate member tips 21' of the hub plate member 20' in a coaxial alignment with the respective radial axis R' thereof. The coaxial alignment position is further defined by each of the spokes 31, 32', 34', 36' being connected to only one of the plate member tips 21' coextensive with the radial axis R' thereof and defines an operative spoke axis for the respective pressurized cylinder 35' which aligns with the radial axis R' of the plate member tips 21'. Each of the plurality of spokes 31, 32', 34', 36' has a pressurized cylinder 35' which includes a cylindrical housing 37', a piston 38' movable within the cylindrical housing 37', and a piston rod 39' connected to the piston 38' and extending outwardly therefrom. The piston 38' and piston rod 39' of each the plurality of pressurized cylinders 35' are operatively movable along the spoke axis. A proximal end of the housing 37' of each of the plurality of pressurized cylinders 35 is connected to the wheel rim 12'. A distal end of the piston rod 39' of each of the plurality of pressurized cylinders 35' is connected to the plate member tips 21' of the hub plate member 20'.

Figure 7:
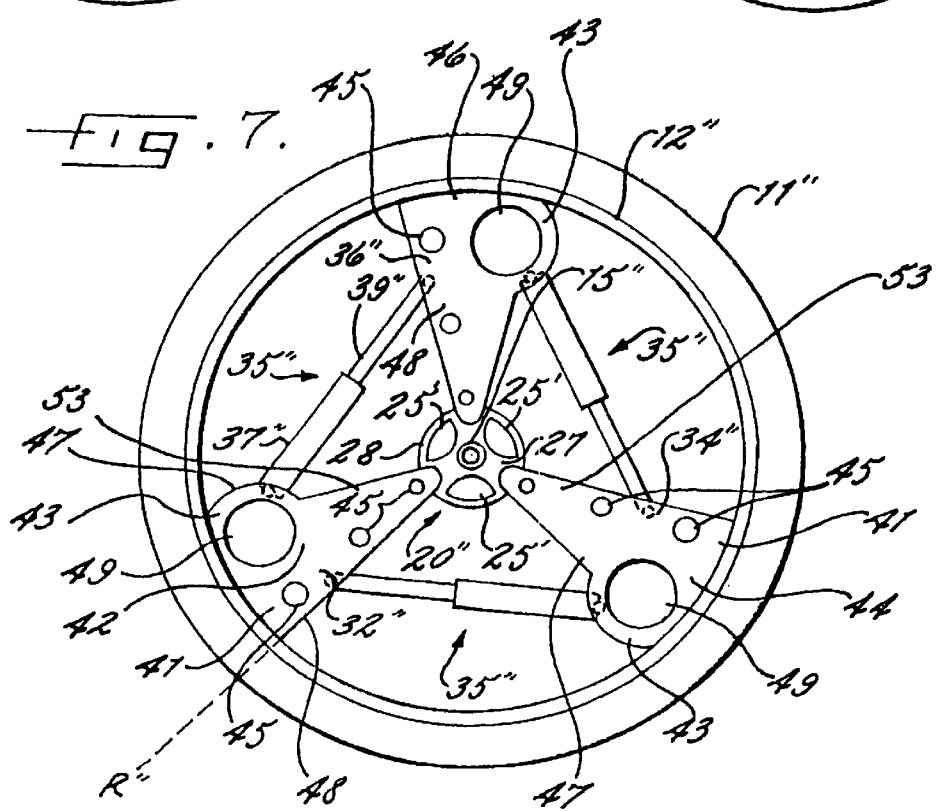
FIG. 7 is a front elevational view of a hydraulic or pneumatic wheel according to a third embodiment of the present invention.

As illustrated in FIGS. 6–7, a wheel 10" according to a third embodiment of the present invention preferably has an annular-shaped wheel rim 12" adapted to have a tire 11" mounted thereto and an annular-shaped wheel hub 15" positioned inwardly and spaced-apart from the rim 12" and adapted to be rotatably mounted to a frame of a light-weight vehicle. The wheel 10" also includes a hub plate member 20" having a medial portion thereof connected to the wheel hub 15" and having other portions extending outwardly therefrom toward the wheel rim 12". The hub plate member 20" has a generally circular shape and has a plurality of openings 25' extending therethrough. The number of the plurality of openings correspond to the number of a plurality of spokes 32", 34", 36". The hub plate member 20" further has three tab members 27 which extend outwardly from the hub 15" and connect to and support a ring member 28.

The plurality of spokes 32", 34", 36" of the wheel 10" is positioned in a spaced-apart relation to each other. Each of the plurality of spokes 32", 34", 36" has a first end connected to the rim 12" and a second end connected to the hub plate member 20" along a respective radial axis. Each of the plurality of spokes 32", 34", 36" includes a spoke plate member 42, 44, 46. The plurality of spokes 32", 34", 36" is preferably three spokes as illustrated and each of which are formed or defined by the spoke plate member 42, 44, 46. Each of the spoke plate members 42, 44, 46 includes a spoke plate base portion 41 having a proximal end thereof connected to the wheel rim 12" and a spoke plate extension portion 53 having a proximal end integrally formed with a distal end of the spoke plate base portion 41 and having a distal end connected to the hub plate member 20".

The wheel 10" further includes a plurality of pressurized cylinders 35" connected to and extending between the spoke plate members 42, 44, 46. Each of the plurality of pressurized cylinders 35" preferably includes a cylindrical housing 37", a piston 38" movable within the cylindrical housing 37", and a piston rod 39" connected to the piston 38" and extending outwardly therefrom. The plurality of pressurized cylinders 35" is preferably connected to and advantageously extends between the three spoke plate members 42, 44, 46 and in combination preferably define a triangular configuration, e.g., an equilateral triangle. Cylinders 35" are connected to spoke plate members 42, 44, and 46, as known to those skilled in the art.

Each of the cylindrical housings 37" of the plurality of pressurized cylinders 35" is connected to a first side periphery 47 of a respective spoke plate base portion 41. Each of the piston rods 39" of the plurality of pressurized cylinders is connected to a second side periphery 48 of a respective spoke plate base portion 41. The second side periphery 48 of the spoke plate member 42, 44, 46 preferably is relatively straight along the radial axis R". Each spoke plate member 42, 44, 46 has a plurality of openings 45 extending through the spoke plate member and distributed in a spaced-apart relation between the rim 12" and the hub plate member 20" adjacent the second side periphery 48. The plurality of openings 45 which are distributed along the second side periphery 48 have diameters which respectively decrease in size as the openings 45 are distributed from the wheel rim 12" to the wheel hub 15".

The spoke plate base portion 41 preferably includes a bulbous portion 43 having an opening 49 extending therethrough. The opening 49 in the bulbous portion 43 preferably has a larger diameter than any of the openings 45 distributed along the second side periphery 48. In order to advantageously provide structural strength, especially along a path of shock absorption, the cylindrical housings 37" of the plurality of pressurized cylinders 35" are each respectively connected to the first side periphery 47 of the bulbous portion 43 of a respective spoke plate base portion 41.

Because a hydraulic or pneumatic wheel 10, 10', 10" according to the present invention is advantageously light weight, aerodynamic, absorbs shock, inhibits damage to the tire or rim, and yet has structural strength, the wheel 10, 10', 10" is particularly advantageous for various light weight vehicles such as bicycles, tri-cycles, wheel chairs, and carts. A wheel 10, 10', 10" according to these embodiments of the present invention advantageously uses a minimal number of spokes for providing both the shock absorbing capabilities and the structural strength to support the rim 12 in relation to the hub 15.

As illustrated in FIGS. 1–7, and as described above herein, the present invention also advantageously provides methods of using a wheel 10 for a light weight vehicle. A method according to an embodiment of the present invention preferably includes providing a wheel 10 which includes a wheel rim 12, a wheel hub 15 positioned inwardly and spaced-apart the rim 12, a hub plated member 20 connected to the hub 15, and a plurality of spokes 32, 34, 36 each connected to and extending between the rim 12 and the hub plate member 20 along a respective offset spoke axis OF. Each of the plurality of spokes 32, 34, 36 includes a pressurized cylinder 35 having at least a housing 37 and a piston 38 movable with the housing 37. The method also includes rotatably mounting the wheel 10 to a frame of a light weight vehicle and operably moving the piston 38 of a pressurized cylinder 35 connected to the hub plate member 20 in an offset position so as to absorb shock received by the wheel rim 12.

According to this method, the hub plate member 20 preferably includes a plurality of plate member tips 21 extending outwardly from the hub 15 along a radial axis R. The offset spoke axis OF is preferably defined by each of the spokes 32, 34, 36 being connected to a respective one of the plate member tips 21 at a predetermined angle θ from and at an intersection with the radial axis R. The predetermined angle θ is preferably less than 90 degrees and is defined from the wheel hub 15, along the radial axis R to the intersection of the radial and offset spoke axes R, OF, and toward the wheel rim 12 along the offset spoke axis OF. Further, the hub plate member 20 preferably has peripheral recessed portions 22 extending between each of the plurality of plate member tips 21 and being recessed from an axis A1, extending between the plurality of plate member tips 21, and extending inwardly toward the wheel hub 15.

Another method of using a wheel 10" for a light weight vehicle preferably includes providing a wheel 10" which includes a wheel rim 12", a wheel hub 15" positioned inwardly and spaced-apart the rim 12", a hub plated member 20" connected to the hub 15", a plurality of spokes 32", 34", 36" each connected to and extending between the rim 12" and the hub plate member 20" along a radial spoke axis R", and a corresponding plurality of pressurized cylinders 35" each connected to and extending between a pair of the plurality of spokes 32", 34", 36". Each of the cylinders 35" preferably has at least a housing 37" and a piston 38" movable with the housing 37". The method also includes rotatably mounting the wheel 10" to a frame of a light weight vehicle and operably moving the piston 38" of a pressurized cylinder 35" connected to one of the plurality of spokes 32", 34", 36" so as to advantageously absorb shock received by the wheel rim 12" in an effective manner.

As illustrated and described above herein, the present invention advantageously provides a hydraulic or pneumatic wheel 10, 10', 10" and methods of using a wheel 10, 10', 10" which reduce or inhibit damage to the wheel itself, particularly where the wheel uses light-weight metal material or other light weight materials for the construction thereof. The present invention also advantageously provides a hydraulic or pneumatic wheel 10, 10', 10" and associated methods that improved shock absorption when used is association with light weight vehicles such as bicycles, wheelchairs, carts, and the like. The present invention additionally advantageously provides a hydraulic or pneumatic wheel 10, 10', 10" and associated methods which provide structural strength and yet is relatively less expensive to manufacture.

In the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A wheel for a light-weight vehicle, the wheel comprising:
   an annular-shaped wheel rim adapted to have a tire mounted thereto;
   an annular-shaped wheel hub positioned inwardly and spaced-apart from said rim and adapted to be rotatably mounted to a frame of a light-weight vehicle;
   a hub plate member having a substantially triangular configuration, having a medial portion thereof connected to said wheel hub, and having other portions extending outwardly therefrom toward said wheel rim, said other portions including a plurality of plate member tips each formed along a radial axis extending outwardly from said wheel hub; and a plurality of spokes positioned in a spaced-apart relation to each other, each of said plurality of spokes having a first end connected to said rim and a second end connected to one of the plurality of plate member tips of said hub plate member in an offset position from the respective radial axis thereof, each of said plurality of spokes comprising a pressurized cylinder, said pressurized cylinder including a housing, a piston movable within said housing, and a piston rod connected to said piston and extending outwardly therefrom.

2. A wheel as defined in claim 1, wherein the offset position is further defined by each of the spokes being connected to only one of the plate member tips at a predetermined angle from the radial axis thereof and defining an operative offset spoke axis for the respective pressurized cylinder which intersects the radial axis of the plate member tips at the predetermined angle, the predetermined angle being less than 90 degrees and being defined from said wheel hub, extending along the radial axis to the intersection of the radial and offset spoke axes, and toward said wheel rim along the offset spoke axis, the piston and piston rod of each said plurality of pressurized cylinders being operatively movable along the offset spoke axis.

3. A wheel as defined in claim 1, wherein said non-circular shaped hub plate member has peripheral recessed portions extending between each of the plurality of plate member tips and being recessed from an axis also extending between the plurality of plate member tips and extending inwardly toward said wheel hub.

4. A wheel as defined in claim 1, wherein said hub plate member has a generally triangular configuration, each corner of the triangular configuration being rounded and defining a plate member tip, and each side of the triangular configuration being concave inwardly toward said wheel hub.

5. A wheel as defined in claim 1, wherein a proximal end of the housing of each of the plurality of pressurized cylinders is connected to said wheel rim, and wherein a distal end of the piston rod of each of the plurality of pressurized cylinders is connected to the plate member tips of said hub plate member.

6. A wheel for a light-weight vehicle, the wheel comprising:

an annular-shaped wheel rim adapted to have a tire mounted thereto;

an annular-shaped wheel hub positioned inwardly and spaced-apart from said rim and adapted to be rotatably mounted to a frame of a light-weight vehicle;

a substantially triangular shaped hub plate member having a medial portion thereof connected to said wheel hub and having other portions extending outwardly therefrom toward said wheel rim, said other portions including a plurality of plate member tips each formed along a radial axis extending outwardly from said wheel hub, said hub plate member also having peripheral recessed portions extending between each of the plurality of plate member tips and being recessed from an axis also extending between the plurality of plate member tips and extending inwardly toward said wheel hub; and a plurality of spokes positioned in a spaced-apart relation to each other, each of said plurality of spokes having a first end connected to said rim and a second end connected to one of the plurality of plate member tips of said hub plate member in an offset position from the respective radial axis thereof, each of said plurality of spokes comprising a pressurized cylinder, said pressurized cylinder including a cylindrical housing, a piston movable within said cylindrical housing, and a piston rod connected to said piston and extending outwardly therefrom, a proximal end of the housing of each of the plurality of pressurized cylinders being connected to said wheel rim and a distal end of the piston rod of each of the plurality of pressurized cylinders being connected to the plate member tips of said hub plate member.

7. A wheel as defined in claim 6, wherein the offset position is further defined by each of the spokes being connected to only one of the plate member tips at a predetermined angle from the radial axis thereof and defining an operative offset spoke axis for the respective pressurized cylinder which intersects the radial axis of the plate member tips at the predetermined angle, the predetermined angle being less than 90 degrees and being defined from said wheel hub, extending along the radial axis to the intersection of the radial and offset spoke axes, and toward said wheel rim along the offset spoke axis, the piston and piston rod of each said plurality of pressurized cylinders being operatively movable along the offset spoke axis.

8. A wheel as defined in claim 7, wherein said hub plate member has a generally triangular configuration, each corner of the triangular configuration being rounded and defining a plate member tip, and each side of the triangular configuration being concave inwardly toward said wheel hub.

9. A wheel for a light-weight vehicle, the wheel comprising:

an annular-shaped wheel rim adapted to have a tire mounted thereto;

an annular-shaped wheel hub positioned inwardly and spaced-apart from said rim and adapted to be rotatably mounted to a frame of a light-weight vehicle;

a substantially rectangular hub plate member having a medial portion thereof connected to said wheel hub and having other portions extending outwardly therefrom toward said wheel rim, said other portions including a plurality of plate member tips each formed along a radial axis extending outwardly from said wheel hub; and a plurality of spokes positioned in a spaced-apart relation to each other, each of said plurality of spokes having a first end connected to said rim and a second end connected to one of the plurality of plate member tips of said hub plate member in a coaxial alignment with the respective radial axis thereof, each of said plurality of spokes comprising a pressurized cylinder, said pressurized cylinder including a cylindrical housing, a piston movable within said cylindrical housing, and a piston rod connected to said piston and extending outwardly therefrom.

10. A wheel as defined in claim 9, wherein said non-circular shaped hub plate member has peripheral recessed portions extending between each of the plurality of plate member tips and being recessed from an axis also extending between the plurality of plate member tips and extending inwardly toward said wheel hub.

11. A wheel as defined in claim 10, wherein said hub plate member has a generally rectangular configuration, each corner of the rectangular configuration defining a plate member tip, and each side of the rectangular configuration being concave inwardly toward said wheel hub.

12. A wheel as defined in claim 11, wherein the coaxial alignment position is further defined by each of the spokes being connected to only one of the plate member tips coextensive with the radial axis thereof and defining an operative spoke axis for the respective pressurized cylinder which aligns with the radial axis of the plate member tips, the piston and piston rod of each said plurality of pressurized cylinders being operatively movable along the spoke axis.

13. A wheel as defined in claim 12, wherein said medial portion of said generally rectangular-shaped hub plate member has a generally circular shape, and wherein said hub plate member further includes a plurality of triangular-shaped openings each formed in said hub plate member between said circular-shaped medial portion and a respective one of said plurality of plate member tips to thereby enhance the aerodynamics thereof.

14. A wheel as defined in claim 13, wherein a proximal end of the housing of each of the plurality of pressurized cylinders is connected to said wheel rim, and wherein a distal end of the piston rod of each of the plurality of pressurized cylinders is connected to the plate member tips of said hub plate member.

15. A wheel for a light-weight vehicle, the wheel comprising:
    an annular-shaped wheel rim adapted to have a tire mounted thereto;
    an annular-shaped wheel hub positioned inwardly and spaced-apart from said rim and adapted to be rotatably mounted to a frame of a light-weight vehicle;
    a non-circular shaped hub plate member having a medial portion thereof connected to said wheel hub and having other portions extending outwardly therefrom toward said wheel rim, said other portions including a plurality of plate member tips having truncated end portions and arcuate sides, each plate member tip formed along a radial axis extending outwardly from said wheel hub, said medial portion of said non-circular shaped hub plate member having a substantially circular shape, and said hub plate member further having a plurality of triangular-shaped openings each formed in said hub plate member between said circular-shaped medial portion and a respective one of said plurality of plate member tips to thereby enhance the aerodynamics thereof; and
    a plurality of spokes positioned in a spaced-apart relation to each other, each of said plurality of spokes having a first end connected to said rim and a second end connected to one of the plurality of plate member tips of said hub plate member in a coaxial alignment with the respective radial axis thereof, each of said plurality of spokes comprising a pressurized cylinder, said pressurized cylinder including a housing, a piston movable within said housing, and a piston rod connected to said piston and extending outwardly therefrom.

16. A wheel as defined in claim 15, wherein said non-circular shaped hub plate member has peripheral recessed portions extending between each of the plurality of plate member tips and being recessed from an axis also extending between the plurality of plate member tips and extending inwardly toward said wheel hub.

17. A wheel as defined in claim 15, wherein the coaxial alignment position is further defined by each of the spokes being connected to only one of the plate member tips coextensive with the radial axis thereof and defining an operative spoke axis for the respective pressurized cylinder which aligns with the radial axis of the plate member tips, the piston and piston rod of each said plurality of pressurized cylinders being operatively movable along the spoke axis.

18. A wheel as defined in claim 17, wherein a proximal end of the housing of each of the plurality of pressurized cylinders is connected to said wheel rim, and wherein a distal end of the piston rod of each of the plurality of pressurized cylinders is connected to the plate member tips of said hub plate member.

19. A wheel for a light-weight vehicle, the wheel comprising:
    an annular-shaped wheel rim adapted to have a tire mounted thereto;
    an annular-shaped wheel hub positioned inwardly and spaced-apart from said rim and adapted to be rotatably mounted to a frame of a light-weight vehicle;
    a hub plate member having a medial portion thereof connected to said wheel hub and having other portions extending outwardly therefrom toward said wheel rim;
    a plurality of spokes positioned in a spaced-apart relation to each other, each of said plurality of spokes extending along a radial axis of the wheel and having a first end connected to said rim and a second end connected to said hub plate member, each of said plurality of spokes comprising a substantially flat spoke plate member; and
    a plurality of pressurized cylinders connected to and extending between said spoke plate members, each of said plurality of pressurized cylinders including a cylindrical housing, a piston movable within said cylindrical housing, and a piston rod connected to said piston and extending outwardly therefrom.

20. A wheel as defined in claim 19, wherein said plurality of spokes comprises three spokes each formed by the spoke plate member, and wherein said plurality of pressurized cylinders connected to and extending between the three spoke plate members and in combination define a triangular configuration.

21. A wheel as defined in claim 19, wherein each of said spoke plate members includes a spoke plate base portion having a proximal end thereof connected to said wheel rim and a spoke plate extension portion having a proximal end integrally formed with a distal end of said spoke plate base portion and having a distal end connected to said hub plate member.

22. A wheel as defined in claim 21, wherein each of said cylindrical housings of said plurality of pressurized cylinders is connected to a first side periphery of a respective spoke plate base portion, and wherein each of said piston rods of said plurality of pressurized cylinders is connected to a second side periphery of a respective spoke plate base portion.

23. A wheel as defined in claim 22, wherein the second side periphery of said spoke plate is relatively straight along the radial axis, and wherein said spoke plate has a plurality of openings extending through said spoke plate and distributed in a spaced-apart relation between said wheel rim and said hub plate member adjacent the second side periphery.

24. A wheel as defined in claim 23, wherein the plurality of openings distributed along the second side periphery have diameters which respectively decrease in size from said wheel rim to said wheel hub.

25. A wheel as defined in claim 22, wherein said spoke plate base portion includes a bulbous portion having an opening extending therethrough, and wherein each of said cylindrical housings of said plurality of pressurized cylinders is respectively connected to the first side periphery of the bulbous portion of said spoke plate base portion.

26. A wheel as defined in claim 19, wherein said hub plate member has a generally circular shape and has a plurality of openings extending therethrough, the number of said plurality of openings corresponding to the number of said plurality of spokes.

27. A wheel for a light-weight vehicle, the wheel comprising:

an annular-shaped wheel rim adapted to have a tire mounted thereto;

an annular-shaped wheel hub positioned inwardly and spaced-apart from said rim and adapted to be rotatably mounted to a frame of a light-weight vehicle;

a circular-shaped hub plate member having a medial portion thereof connected to said wheel hub and having other portions extending outwardly therefrom toward said wheel rim, said circular-shaped hub plate member also having a predetermined plurality of openings extending therethrough;

a plurality of spokes positioned in a spaced-apart relation to each other, the number of said plurality of spokes respectively corresponding to the number of said plurality of opening in said hub plate member, each of said plurality of spokes extending along a radial axis of the wheel and having a first end connected to said rim and a second end connected to said hub plate member, each of said plurality of spokes comprising a substantially flat spoke plate member, each of said spoke plate members including a spoke plate base portion having a proximal end thereof connected to said wheel rim and a spoke plate extension portion having a proximal end integrally formed with a distal end of said spoke plate base portion and having a distal end connected to said hub plate member; and a plurality of pressurized cylinders connected to and extending between said spoke plate members, each of said plurality of pressurized cylinders including a cylindrical housing, a piston movable within said cylindrical housing, and a piston rod connected to said piston and extending outwardly therefrom.

28. A wheel as defined in claim 27, wherein said plurality of spokes comprises three spokes each formed by the spoke plate member, and wherein said plurality of pressurized cylinders connected to and extending between the three spoke plate members and in combination define a triangular configuration.

29. A wheel as defined in claim 28, wherein each of said cylindrical housings of said plurality of pressurized cylinders is connected to a first side periphery of a respective spoke plate base portion, and wherein each of said piston rods of said plurality of pressurized cylinders is connected to a second side periphery of a respective spoke plate base portion.

30. A wheel as defined in claim 29, wherein the second side periphery of said spoke plate is relatively straight along the radial axis, and wherein said spoke plate has a plurality of openings extending through said spoke plate and distributed in a spaced-apart relation between said wheel rim and said hub plate member adjacent the second side periphery.

31. A wheel as defined in claim 30, wherein the plurality of openings distributed along the second side periphery have diameters which respectively decrease in size from said wheel rim to said wheel hub.

32. A wheel as defined in claim 31, wherein said spoke plate base portion includes a bulbous portion having an opening extending therethrough, the bulbous portion opening having a larger diameter than any of the plurality of openings distributed along the second side periphery, and wherein each of said cylindrical housings of said plurality of pressurized cylinders is respectively connected to the first side periphery of the bulbous portion of said spoke plate base portion.

33. A method of absorbing shock received by a wheel of a light-weight vehicle, the method comprising:

providing a wheel which includes a wheel rim, a wheel hub positioned inwardly and spaced-apart the rim, a substantially triangular hub plate member connected to the hub, and a plurality of spokes each connected to and extending between the rim and the hub plate member along a respective offset spoke axis, each of the plurality of spokes including a pressurized cylinder having at least a housing and a piston movable with the housing;

rotatably mounting the wheel to a frame of a light weight vehicle; and operably moving the piston of a pressurized cylinder connected to the hub plate member in an offset position so as to absorb shock received by the wheel rim.

34. A method as defined in claim 33, wherein the hub plate member includes a plurality of plate member tips extending outwardly from the hub along a radial axis, wherein the offset spoke axis is defined by each of the spokes being connected to a respective one of the plate member tips at a predetermined angle from and at an intersection with the radial axis, the predetermined angle being less than 90 degrees and being defined from the wheel hub, extending along the radial axis to the intersection of the radial and offset spoke axes, and toward the wheel rim along the offset spoke axis.

35. A method as defined in claim 34, wherein the hub plate member has peripheral recessed portions extending between each of the plurality of plate member tips and being recessed from an axis also extending between the plurality of plate member tips and extending inwardly toward the wheel hub.

36. A method of absorbing shock received by a wheel of a light-weight vehicle, the method comprising:

providing a wheel which includes a wheel rim, a wheel hub positioned inwardly and spaced-apart from the rim, a substantially triangular hub plate member connected to the hub, said hub plate member further having a plurality of substantially semi-circular openings, a plurality of substantially triangular spoke plate members each connected to and extending between the rim and the hub plate member along a radial spoke axis and having a bulbous extension at a base thereof connected to the rim, and a corresponding plurality of pressurized cylinder each connected to and extending between a pair of the plurality of spokes and each having at least a housing and a piston movable with the housing;

rotatably mounting the wheel to a frame of a light weight vehicle; and operably moving the piston of a pressurized cylinder connected to one of the plurality of spokes so as to absorb shock received by the wheel rim.

* * * * *